(12) United States Patent
Kuwahara

(10) Patent No.: US 7,292,997 B2
(45) Date of Patent: Nov. 6, 2007

(54) APPARATUS AND METHOD OF RECEIVING ORDER, STORAGE MEDIUM, AND METHOD OF POINT SERVICE

(75) Inventor: Toru Kuwahara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1257 days.

(21) Appl. No.: 09/876,884

(22) Filed: Jun. 7, 2001

(65) Prior Publication Data
US 2002/0032606 A1  Mar. 14, 2002

(30) Foreign Application Priority Data
Jun. 8, 2000  (JP) ............................. 2000-172045
Jun. 4, 2001  (JP) ............................. 2001-168488

(51) Int. Cl.
*G06Q 40/00* (2006.01)
(52) U.S. Cl. ............................. 705/39; 705/14; 705/35
(58) Field of Classification Search .................. 705/14, 705/39, 35
See application file for complete search history.

(56) References Cited

U.S. PATENT DOCUMENTS 6,078,891 A * 6/2000 Riordan et al. ............... 705/10
6,594,640 B1 * 7/2003 Postrel ........................ 705/14

FOREIGN PATENT DOCUMENTS

| JP | 09-212742 | 8/1997 |
| JP | 10-078989 | 3/1998 |
| JP | 10-154274 | 6/1998 |
| JP | 11-345371 | 12/1999 |
| TW | 338136 | 8/1998 |
| WO | WO 99/14695 | 3/1999 |
| WO | WO 01/33451 * | 5/2001 |

OTHER PUBLICATIONS

Decision of Refusal Mar. 9, 2004.

* cited by examiner

*Primary Examiner*—James Kramer
*Assistant Examiner*—Kirsten Sachwitz Apple
(74) *Attorney, Agent, or Firm*—Katten Muchin Rosenman LLP

(57) ABSTRACT

A store apparatus stores a point calculation method that is applied usually, and stores also specific combinations of commodities names, as well as a specific point calculation method that is applied to those specific combinations. When an order of commodities is received from an ordering apparatus, it is judged if those commodities are one of the specific combinations of commodities When it is one of the specific combinations, points are calculated using the specific point calculation method. By making the specific point calculation method more advantageous to customers than the usual point calculation method, it is possible to excite customers' will to purchase the specific commodities.

13 Claims, 14 Drawing Sheets

FIG.4

COMMODITY DATABASE

| COMMODITY ID (2351) | COMMODITY NAME (2352) | SELLING PRICE (2353) | PROPERTY (2354) | IMAGE (2355) |
|---|---|---|---|---|
| A001 | ○○○ | 1,000 | HOUSEHOLD ELECTRIC APPLIANCE | ... |
| A002 | △○× | 2,000 | GAME MACHINE | ... |
| ⋮ | ⋮ | ⋮ | ⋮ | ⋮ |

CUSTOMER DATABASE

236

| |
|---|
| CUSTOMER ID — 2361 |
| CUSTOMER NAME — 2362 |
| E-MAIL ADDRESS — 2363 |
| COMMODITY DELIVERY ADDRESS — 2364 |
| SETTLEMENT INFORMATION — 2365 |
| OBTAINED POINTS — 2366 |
| PURCHASE HISTORY — 2367 |

POINT SETTING FILE

| COMMODITY ID | RATE % |
|---|---|
| (BASIC POINT RATE) | 10 |
| A001&A005 | 15 |
| A002&A008&B01 | 12 |
| ⋮ | ⋮ |

2371, 2372, 237, 237a, 237b, 237c

SPECIFIC POINT RATE SETTING SCREEN

FIG.15
POINT SETTING FILE

| | COMMODITY ID | RATE % | START DATE | EXPIRATION DATE |
|---|---|---|---|---|
| 337a | (BASIC POINT RATE) | 10 | | |
| 337b | A001 & A005 | 15 | 1/15 | 1/31 |
| 337c | A002 & A008 & B01 | 12 | 1/15 | 2/10 |

3371, 3372, 3373, 3374, 337

FIG.16
GIVING POINTS SETTING SCREEN

BASIC POINT RATE  10  %

SPECIFIC POINT RATE

| COMMODITY ID | RATE | START DATE | EXPIRATION DATE |
|---|---|---|---|
| A001 & A005 | 15 | 1/15 | 1/31 |
| A002 & A008 & B01 | 12 | 1/15 | 2/10 |
| | | | |

OK

APPARATUS AND METHOD OF RECEIVING ORDER, STORAGE MEDIUM, AND METHOD OF POINT SERVICE

This application claims a priority based on Japanese Patent Application Nos. 2000-172045 and 2001-168488 filed on Jun. 8, 2000, and Jun. 4, 2001 respectively, the entire contents of which are incorporated herein by reference for all purposes.

BACKGROUND OF THE INVENTION

1. Field of the Invention

The present invention relates to points given to a customer who has purchased a commodity etc. and, in particular, to point service in a business transaction performed online using a computer network.

2. Related Art Statement

Point service in which points are given to a customer according to an amount of his purchase is widely provided by actual stores with the intention of exciting customers' will to purchase or enclosing customers, for example. The point system is arranged such that points obtained by a customer have a monetary value, for example, in a store that has given those points. When a customer who has received points purchases a commodity in that store, he can allot those points to a part of its purchase price.

A customer tends to make a purchase in a store that provides point service, and to make a purchase next time and thereafter also in the same store so as to use obtained points. Thus, today, point service is one of very effective sales strategies.

As well as actual stores, this point service is increasingly employed by virtual stores, i.e., so-called online shops, which become one of important sales forms as Internet grows.

SUMMARY OF THE INVENTION

In many cases, either in an actual store or in an online shop, points given to a customer are proportional to a purchase amount. For example, points corresponding to 3% of a purchase amount is given. Usually, this rate is uniformly applied to all the commodities. Many points are given to a purchase of a commodity of a high price, and thus it is possible to excite the will to purchase.

On the other hand, from the viewpoint of a store, there exist commodities of which the store especially wishes to increase their sales numbers, for the sake of a sales strategy. For example, a new product that a store wishes to make known widely, a commodity left in stock sufficiently, an unpopular commodity, a commodity of a short life cycle, and the like may be mentioned. Sometimes, a store may wish to increase a sales number of a specific commodity for a service campaign to customers.

When, however, selling prices are simply lowered for promoting sales of those commodities, it becomes difficult to secure profit of the store. Further, even if the selling prices are lowered, sales numbers can not be increased unless the motive for purchasing the commodities themselves is strengthened. Accordingly, it is desired to develop a technique for increasing a sales number of a specific commodity while securing store's profit.

The present invention has been made considering such situations, and an object of the invention is to excite customers' will to purchase specific commodities.

To attain the above objects, the present invention provides an order receiving apparatus that receives an order of a commodity transaction from a commodity ordering apparatus through a network. The apparatus includes: a first storage means for storing commodity information that includes at least a commodity name and a selling price of a commodity as an object of transaction; a second storage means for storing information specifying combinations of two or more different commodities, and for storing specific parameters concerning economic return, which are applied respectively to said combinations, relating said information and said specific parameters, respectively; a third storage means for storing a general-purpose parameter concerning economic return, which is applied to commodities other than said combinations of commodities; and a means for performing steps of: receiving a request for displaying information on commodities, from said commodity ordering apparatus; referring to the first storage means, to output said commodity information to said commodity ordering apparatus; and referring to the second and third storage means, to output information on said combinations of commodities and said specific parameters applied respectively to said combinations, and information on said general-purpose parameter, to said commodity ordering apparatus.

Further, the order receiving apparatus includes a point generating means that performs steps. The steps include: receiving an order request including information for specifying ordered commodities, from said commodity ordering apparatus; judging if a group of the ordered commodities specified includes commodities related to a combination recorded in the second storage means; calculating first points when it is judged that the commodities related to the combination are included, said first points being decided based on a specific parameter applied to said combination, or based on the specific parameter applied to said combination and on selling prices of the commodities related to said combination; calculating second points with respect to commodities other than the commodities related to said combination, based on the general-purpose parameter, or based on the general-purpose parameter and selling prices of the commodities in question; and outputting total points of the first points and the second points, to said ordering apparatus.

Here, said general-purpose parameter is a value defining a rate to a selling price of a commodity; and said second points may be decided by multiplying the selling prices of the commodities in question by said rate.

Further, said specific parameter are values defining rates to the selling prices of said specific commodities related to a certain combination of commodities, respectively; and said first points may be decided by multiplying the selling prices of the commodities in question by said rates, respectively.

BRIEF DESCRIPTION OF THE DRAWINGS

FIG. 4 is a diagram explaining data structure of a commodity database;

FIG. 5 is a diagram explaining data structure of a customer database;

FIG. 15 is a diagram explaining contents of point setting file in a second embodiment;

FIG. 16 is a view showing an example of a giving points setting screen in the second embodiment.

DETAILED DESCRIPTION

Figure 1:
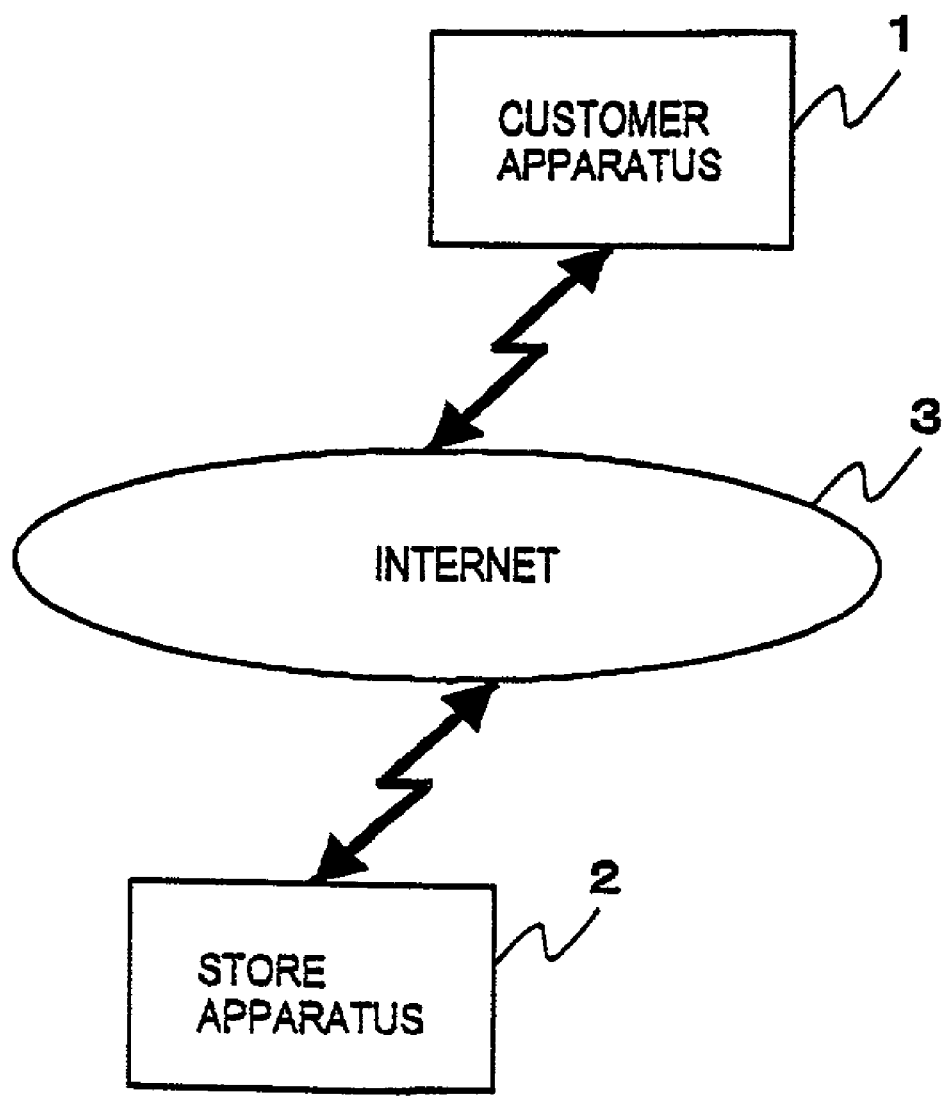
FIG. 1 is a block diagram for explaining an outline of a network sales system according to the present invention.

Now, embodiments of the present invention will be described in detail, referring to the drawings. To begin with, a first embodiment of the present invention will be described.

FIG. 1 is a diagram for explaining an outline of a network sales system according to the present invention. As shown in the figure, this embodiment is an example that the present invention is applied to a network sales system comprising a customer apparatus 1 and a store apparatus 2, those apparatuses being connected with each other through Internet 3. Of course, the present invention is not limited to such a configuration. For example, a plurality of customer apparatuses 1 and a plurality of store apparatuses may exist.

A store of a user of the store apparatus 2 sets up an online shop on Internet 3. An object of transaction in this online shop may be a commodity produced by the store, or may be a commodity made by another. Here, "commodity" may mean service.

A customer, i.e., a user of the customer apparatus 1 can access the online shop to order a desired commodity. To facilitate processing at that time, the store apparatus 2 may obligate the customer to register delivery address information, settlement information, and the like in advance of doing the online shopping. When the store receives the order in the store apparatus 2, the store follows the procedure for delivery to the customer. Here, the "order" includes an advance order.

In this online shop, in order to excite customer's incentive to purchase, points corresponding to an amount of purchase is given to a customer, when an order is received from the customer. Those points can be used within the online shop for receiving a discount corresponding to used points at the conversion rate of, for example, 1 yen to 1 point in the next purchase, or can be used for exchanging a prescribed number of points for a premium commodity.

In principle, the value of points given to a customer is obtained by multiplying an amount of purchase by a certain rate. However, when specific commodities are purchased in a combination, points to be given can be calculated by applying a specific rate. By such an arrangement, it is possible to set a higher rate for a combination of commodities on which an increase of a sales number is desired and commodities whose popularity is higher. As a result, it is possible to excite customers' will to purchase that combination of commodities. Further, by combining some commodities as campaign commodities, and setting a higher rate for that combination, it is also possible to provide additional service to customers.

Figure 2:
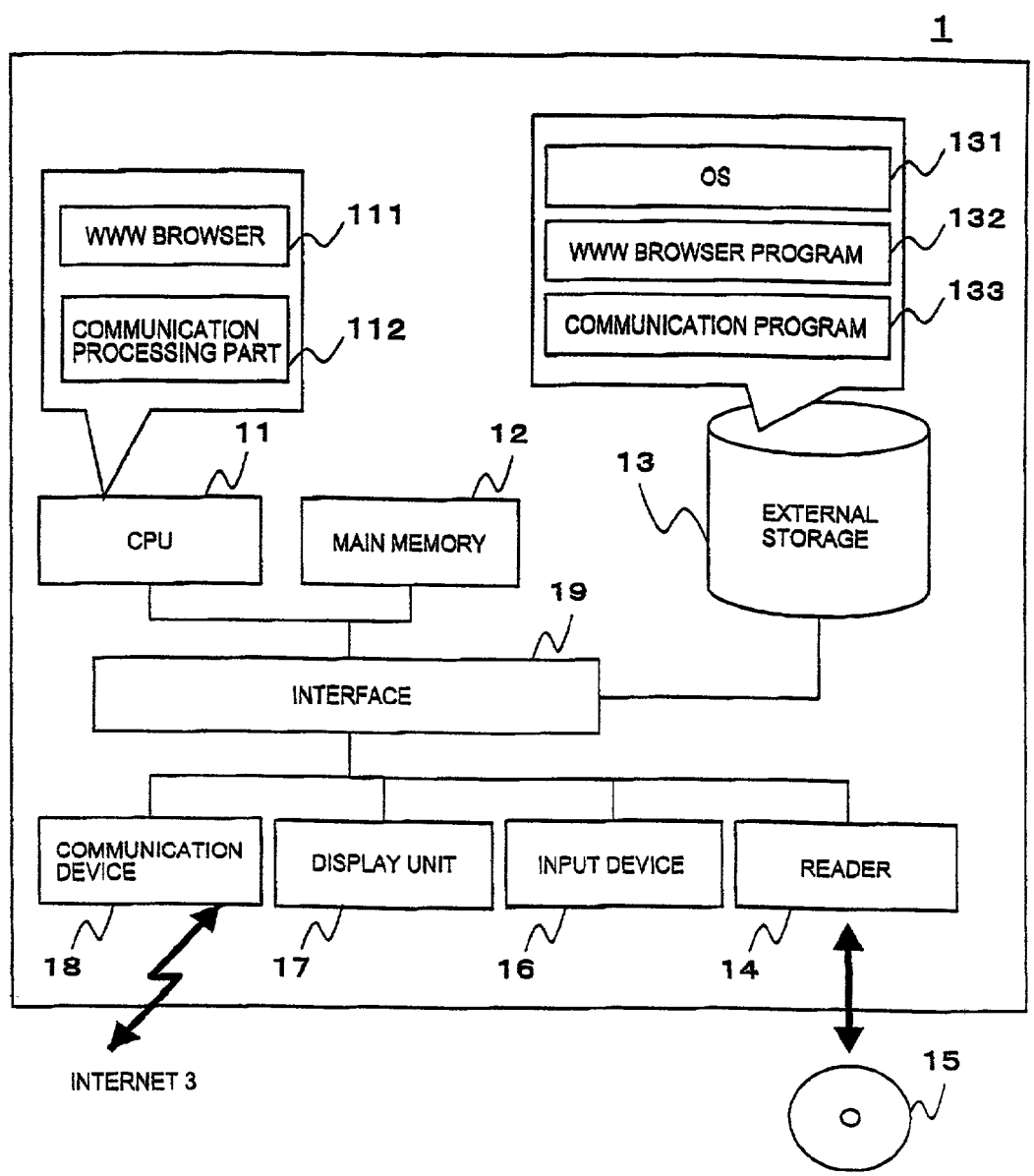
FIG. 2 is a block diagram for explaining an outline of a customer apparatus.

FIG. 2 is an outline block diagram showing the customer apparatus 1. The customer apparatus 1 functions as a commodity ordering apparatus, and, as shown in the figure, can be implemented by a computer of a general configuration, comprising a CPU 11, a main memory 12, an external storage 13 such as a hard disk drive, a reader 14 for reading data, a program, or the like from a portable storage medium 15 such as a CD-ROM, DVD-ROM, or the like, an input device 16 such as a keyboard, mouse, or the like, a display unit 17 such as a CRT display, a communication device 18 for communication with the store apparatus 2 through Internet 3, and an interface 19 in charge of data transmission and reception between the above-mentioned components.

The external storage 13 stores an OS (Operating System) 131 for generally controlling operations of the computer, a WWW browser program 132, and a communication program 133. Of course, other programs may be stored, if necessary.

The CPU 11 loads the WWW browser program 132 and the communication program 133 onto the main memory 12, to execute them. By this, a WWW browser 111 and a communication processing part 112 are realized on the computer.

The WWW browser 111 can browse data of the HTML format (for example, a Web page) opened to the public by the store apparatus 2, utilizing HTTP (Hyper Text Transfer Protocol).

The communication processing part 112 controls the communication device 18, to process various protocols, for example, PPP, TCP/IP and the like, required for the WWW browser 111 to communicate with the store apparatus 2.

Figure 3:
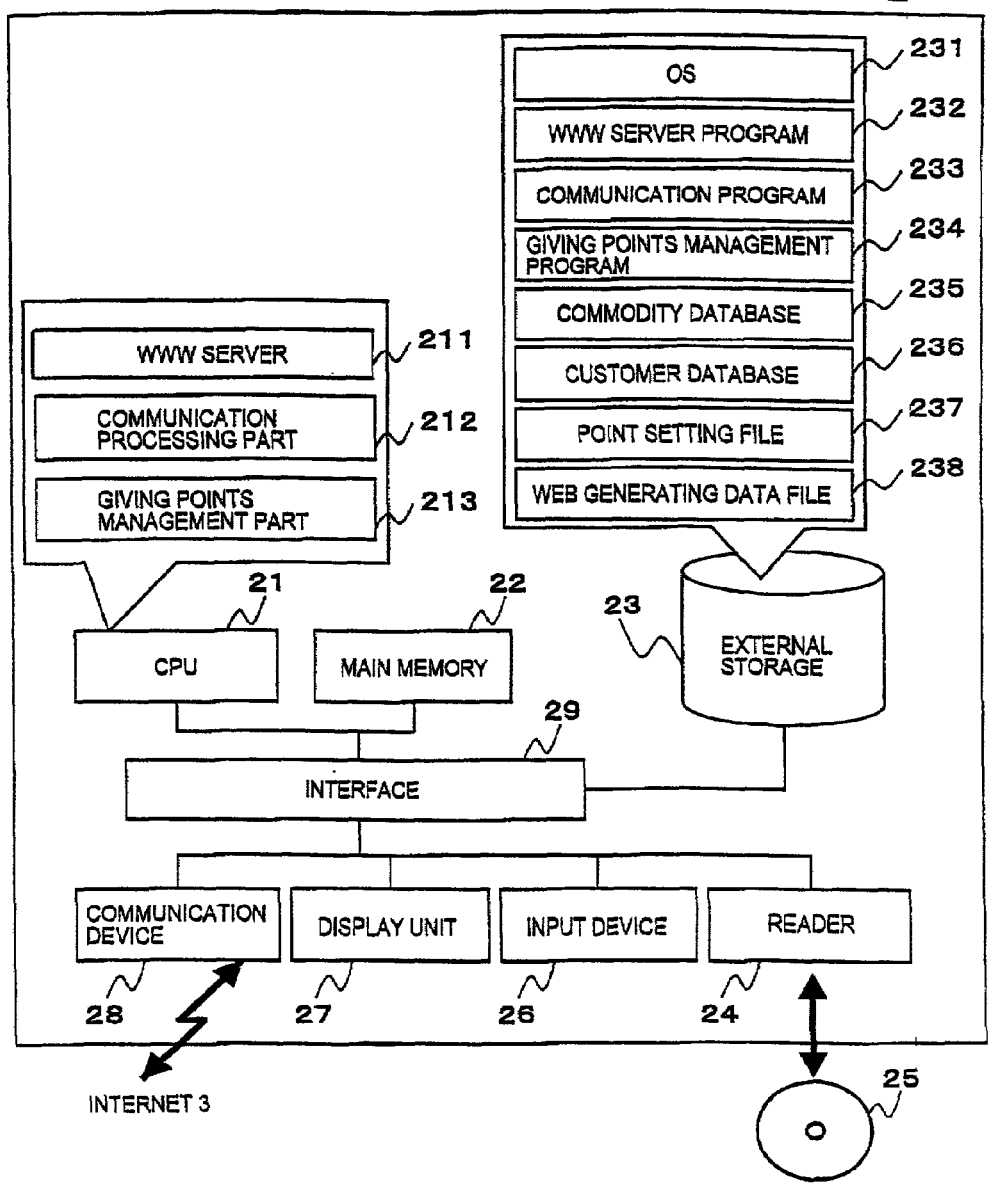
FIG. 3 is a block diagram for explaining an outline of a store apparatus.

FIG. 3 is an outline block diagram showing the store apparatus 2. The store apparatus 2 functions as an order receiving apparatus, and, as shown in the figure, can be implemented by a computer of a general configuration, comprising a CPU 21, a main memory 22, an external storage 23 such as a hard disk drive, a reader 24 for reading data, a program, or the like from a portable storage medium 25 such as a CD-ROM, DVD-ROM, or the like, an input device 26 such as a keyboard, mouse, or the like, a display unit 27 such as a CRT display, a communication device 28 for communication with the customer apparatus 1 through Internet 3, and an interface 29 in charge of data transmission between the above-mentioned components.

The external storage 23 stores an OS (Operation System) 231 for generally controlling operations of the computer, a WWW server program 232, a communication program 233, a giving points management program 234, a commodity database 235, a customer database 236, a point setting file 237, and a Web generating data file 238. Of course other programs may be stored, if necessary.

The CPU 21 loads the WWW server program 232, the communication program 233 and the giving points management program 234 onto the main memory 22, to execute them. By this, a WWW server 211, a communication processing part 212 and a giving points management part 213 are realized on the computer.

The WWW server 211 opens data of the HTML format to the public, so that the WWW browser 111 of the customer apparatus 1 can browse it utilizing HTTP.

The communication processing part 212 controls the communication device 28, to process various protocols for the WWW server 211 to communicate with the customer apparatus 1.

The giving points management part 213 receives setting on points to be given to a customer in purchasing a commodity, and records it into the point setting file 237.

The commodity database 235 stores, for example as shown in FIG. 4, a commodity ID (i.e., a code for identifying a commodity) 2351, a commodity name 2352, a selling price 2353, a property 2354 of the commodity, for example classified into "household electric appliance", "game machine", and "software", and image data 2355 for generating an image of the commodity, relating these fields with one another.

The customer database 236 stores, for example as shown in FIG. 5, a customer ID 2361 for identifying a customer, a customer name 2362, an E-mail address 2363, a commodity delivery address 2364, information required for settling 2365 such as credit card information, the number of points 2366 obtained by the customer, and a purchase history 2367 recording a purchased commodity and its date of purchasing, relating these fields with one another.

Figures 6, 7:
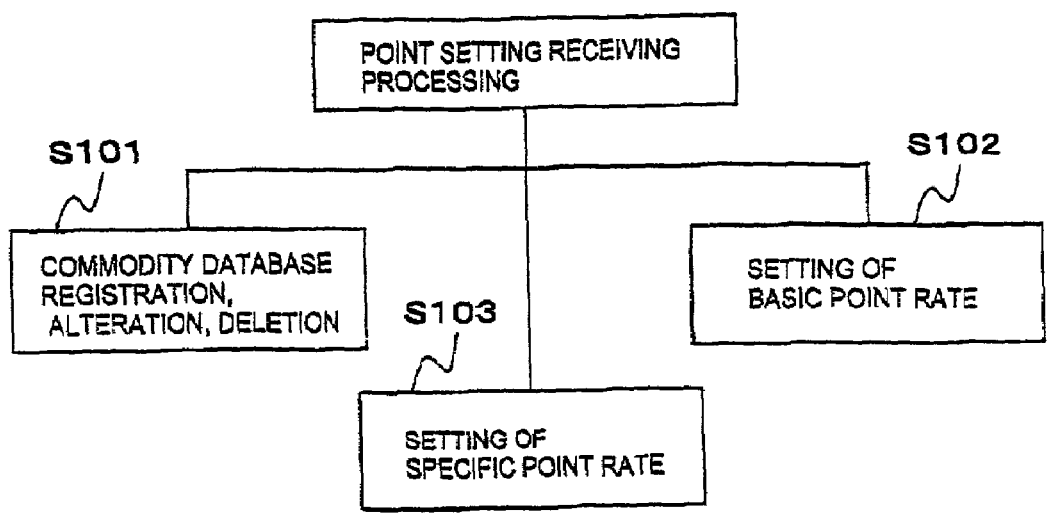
FIG. 6 is a diagram explaining contents of a point setting file.
FIG. 7 is a block diagram showing point setting receiving processing in a store apparatus.

The point setting file 237 is a file for storing information set in relation to giving of points, and stores, for example as shown in FIG. 6, a commodity ID 2371, and a point rate 2372, relating these fields with each other.

In the present embodiment, the first line 237a of the point setting file 237 stores a basic point rate, and specific point rates applied to specific combination of commodities are stored from the second line and downward 237b, 237c, . . . Here, a specific combination of commodities is expressed by connecting a plurality of commodity IDs using "&". The basic point rate and specific point rates will be further described below.

The Web page generating data file 238 stores a page file, template files, and the like for generating Web pages. The WWW server 211 generates Web pages referring to this file.

Next, operation of the network sales system having the above-described configuration will be described.

The network sales system performs processing in which the store apparatus receives setting of points to be given, and processing in which the store apparatus 2 receives access of the customer apparatus 1 and provides the online shop.

First, processing in the store apparatus 2 for receiving setting of points to be given will be described, referring to a block diagram in FIG. 7 showing point setting receiving processing.

As shown in FIG. 4, the commodity database 235 of the store apparatus 2 stores information (for example, selling prices, image data, etc.) on commodities dealt by the store apparatus 2, in advance. Of course, the seller can freely add, delete, modify, and make other operations on the commodity data stored in the commodity database 235 (S101). Such processing can be performed as a usual database operation.

In the present embodiment, it is assumed that points given to a customer is proportional to a purchase price of a commodity ordered. For example, assuming that points corresponding to 10% of a purchase price are given to a customer, when a customer purchases a commodity of a selling price of 1,000 yen, then 100 points corresponding to 10% of 1,000 yen is given to the customer. Of course, this rate can be freely set by the store, and, in principle, the set rate is uniformly applied to all commodities. Hereinafter, this rate is referred to as a basic point rate.

Further, the store can set a point rate that is applied to a specific combination of commodities. For example, it may be decided that, when an order of a commodity A and a commodity B is received in combination, points corresponding to 15% of an amount of purchase of the commodity A and the commodity B are given to the customer. This rate is referred to as a specific point rate.

A specific combination of commodities is not limited to a combination of two commodities, and a specific point rate may be applied to a combination of more than two commodities, for example, to a combination of a commodity A, a commodity B, and a commodity C.

A plurality of specific combinations of commodities may be set, to which different point rates are applied, respectively.

Figure 8:
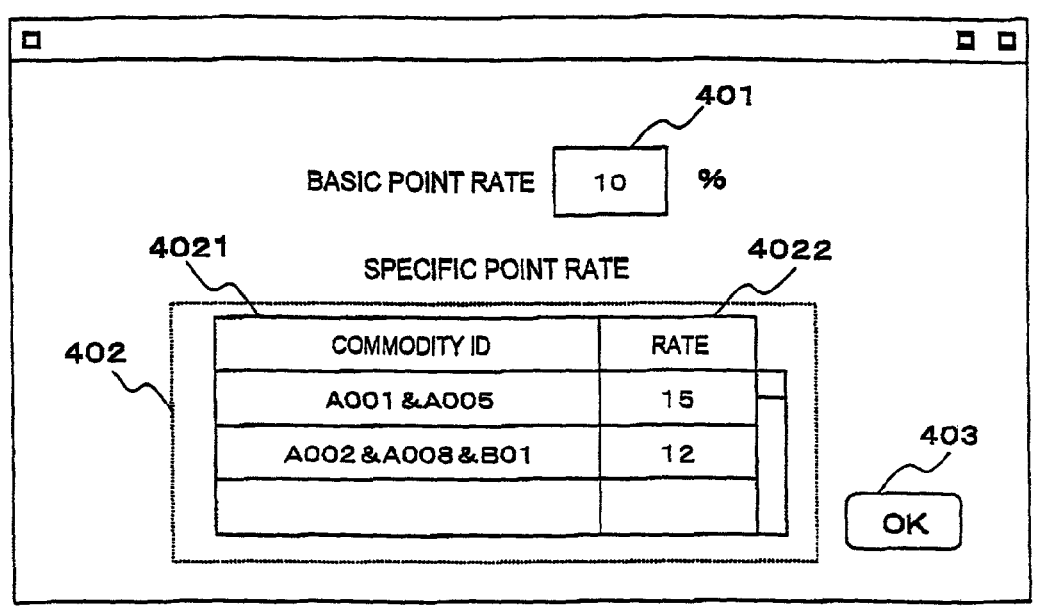
FIG. 8 is a view showing an example of a giving points setting screen.

The store can use the giving points management part 213 to set the basic point rate (S102) and to set the specific point rates (S103). When the giving points management part 213 receives a request of execution from the store, the giving points management part 213 displays a giving points setting screen 400, for example as shown in FIG. 8, on the display unit 27.

As shown in the figure, the giving points setting screen has a basic point rate input area 401 for inputting a basic point rate, a specific point rate input area 402 for inputting specific point rates, and an OK button 403.

The specific point rate input area 402 has a commodity area 4021 for specifying combinations of commodities, and a point area 4022 for inputting point rates.

Previous to displaying this screen, the WWW server 211 refers to the point setting file 237 to obtain values of the already-set basic point rate etc., and displays those values in the basic point rate input area 401 and the specific point rate input area 402 so that the already determined values can be confirmed on this screen 400.

The store uses the input device 26 to input a value into the basic point rate input area 401, or to modify the value in that area.

Further, in the specific point rate input area 402, combinations of commodities, and specific point rates can be inputted or modified. Or, already-inputted combinations and specific point rates can be deleted.

As a method of specifying a combination of commodities, a combination can be specified by connecting IDs of commodities to be combined using "&". Of course, without limited to this names of commodity may be inputted, each being separated by a comma, for example.

In the present embodiment, in the specific point rate input area 402, a specific point rate applied to one combination of commodities is inputted in each line.

When the giving points management part 213 receives a click of the OK button 403, the giving points management part 213 records the data inputted in the basic point rate input area 401 and the specific point rate input area 402, into the point setting file 237.

Figure 9:
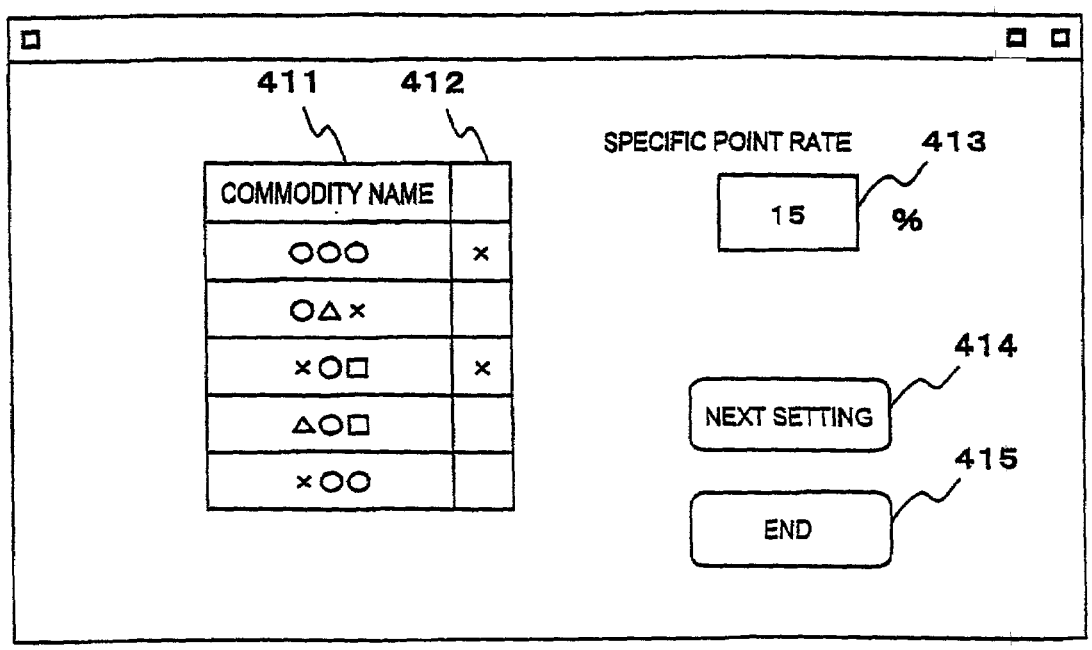
FIG. 9 is a view showing another example of a specific point rate setting screen.

Here, the screen for specifying combinations of commodities is not limited to the present example, and may have various forms. For example, the commodity database 235 may be referred to, in order to display a list of commodities on a specific point rate setting screen 410 for receiving directions on a combination, for example as shown in FIG. 9.

In this figure, the specific point rate setting screen 410 has a commodity list area 411 for displaying a list of commodity names, a commodity check area 412, a specific point rate input area 413, a next setting button 414, and an end of setting button 415.

In the present example, first, commodities relating to a specific combination are set. The store can click the commodity check area 412 corresponding to a commodity constituting a specific combination, and then, can input a point rate applied to this specific combination into the specific point rate input area 413. Then, the next setting button 414 or the end of setting button 415 is clicked to register the setting.

Namely, when the WWW server 211 receives the click of the next setting button 414 or the end of setting button 415 on this screen, the WWW server 211 records a combination of the commodities whose commodity check area 412 is clicked, into the point setting file 237, relating that combination with the point rate inputted in the specific point rate input area 413.

When the received button is the next setting button 414, the commodity check area 412 and the specific point rate input area 413 are cleared, and the present screen is regenerated, to accept information on another combination of commodities. On the other hand, when the received button is the end of setting button 415, the present screen 410 is finished.

Hereinabove, has been described the processing in which the store apparatus 2 receives setting of points to be given.

Next, will be described processing in which the store apparatus 2 receives access of the customer apparatus 1 and provides the online shop.

Figure 10:
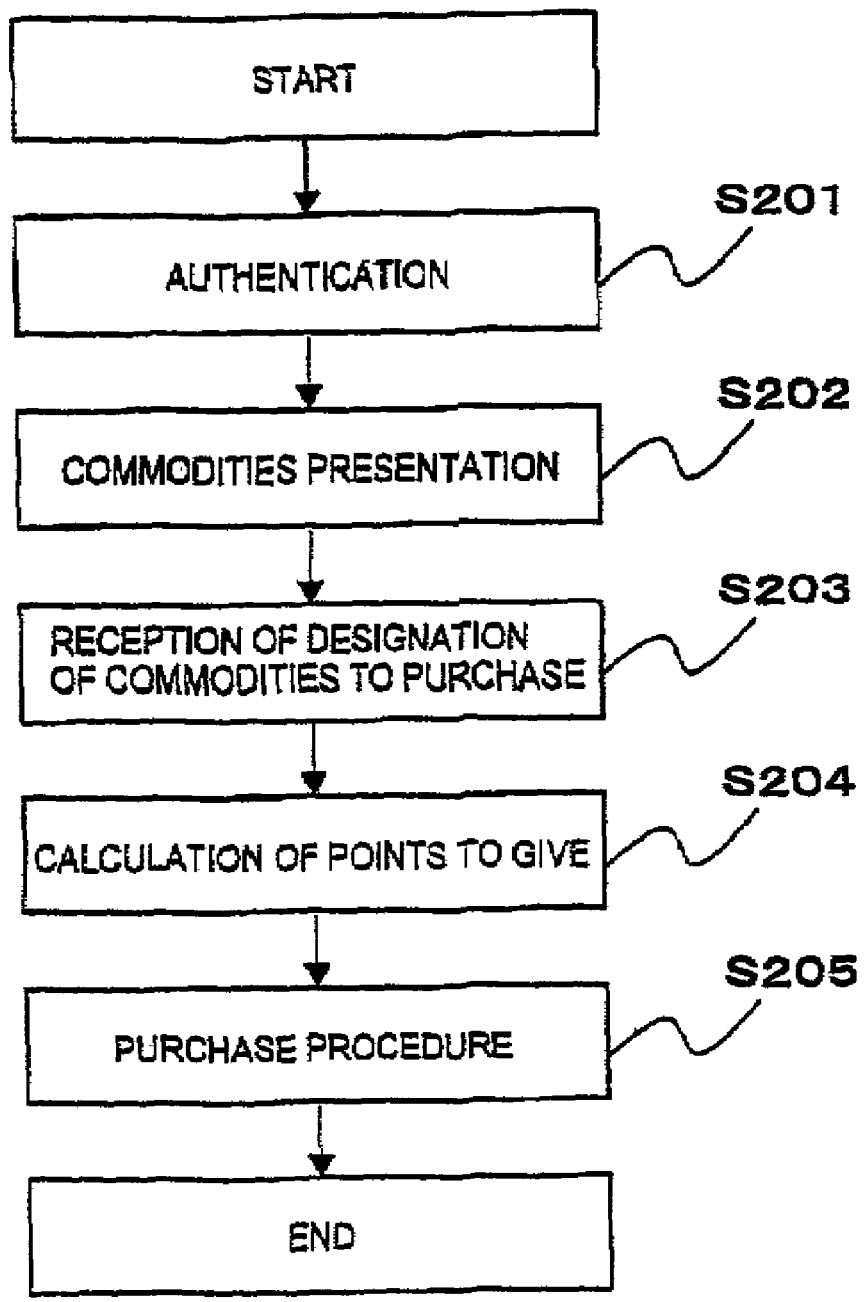
FIG. 10 is a flowchart explaining processing in which a store apparatus accepts access of a customer apparatus, and provides an online shop.

FIG. 10 is a flowchart for explaining operation of the store apparatus 2 in that case.

When the WWW server 211 receives access of the customer apparatus 1 through the communication processing part 212, then, the WWW server 211 makes the WWW browser 111 of the customer apparatus 1 browse a Web page.

Figure 11:
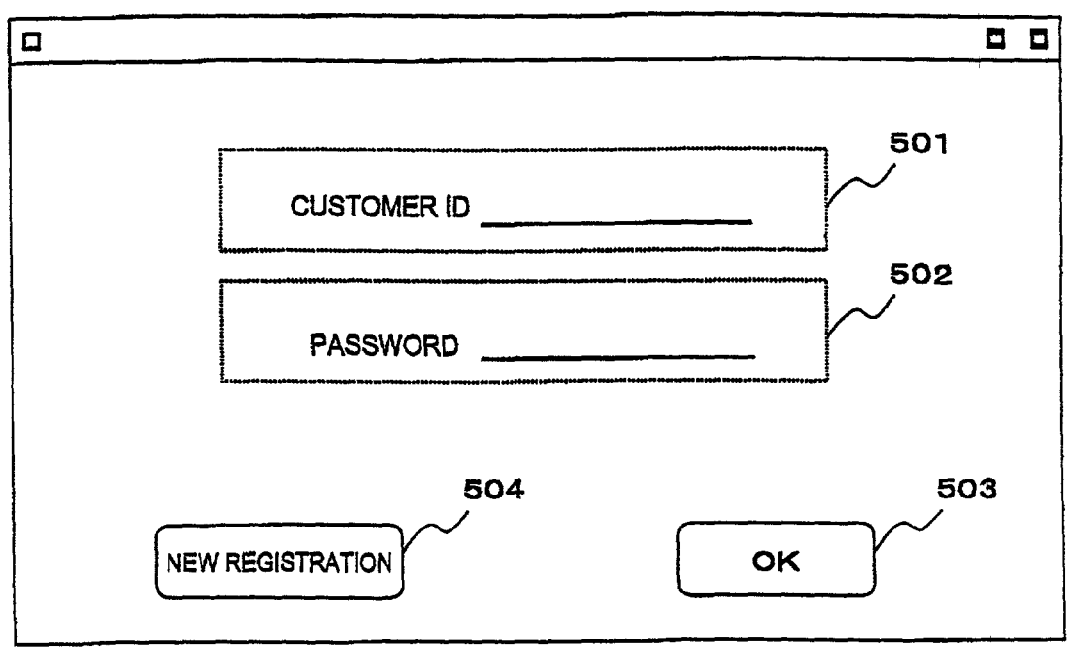
FIG. 11 is a view showing an example of an authentication screen.

First, the WWW server 211 presents an authentication screen 500, for example as shown in FIG. 11, to the WWW browser 111, to perform authentication processing (S201). As shown in the figure, this authentication screen 500 has a customer ID input area 501, a password input area 502, an OK button 503, and a new registration button 504. Here, data for generating screens of Web pages is stored in the Web generating data file 238, and the WWW server 211 generates the Web pages in accordance with prescribed screen transition rules referring to the Web generating data file 238.

A customer who has already registered with this online shop, namely a customer who has registered his information such as a customer name, an E-mail address, commodity delivery address, etc. into the customer database 237 can undergo authentication processing by inputting its own customer ID and password into the customer ID input area 501 and the password input area 502 through the input device 16 and by clicking the OK button 503.

Namely, receiving this information, the WWW server 211 performs the authentication processing referring to the customer database 236 (S201).

On the other hand, an unregistered customer can click the new registration button 504 to display a new registration screen (not shown) for performing new registration processing. In the new registration screen, information to be recorded into the customer database 236 is inputted, to register as a customer. Receiving this information, the WWW server 211 records the information into the customer database 236.

Figure 12:
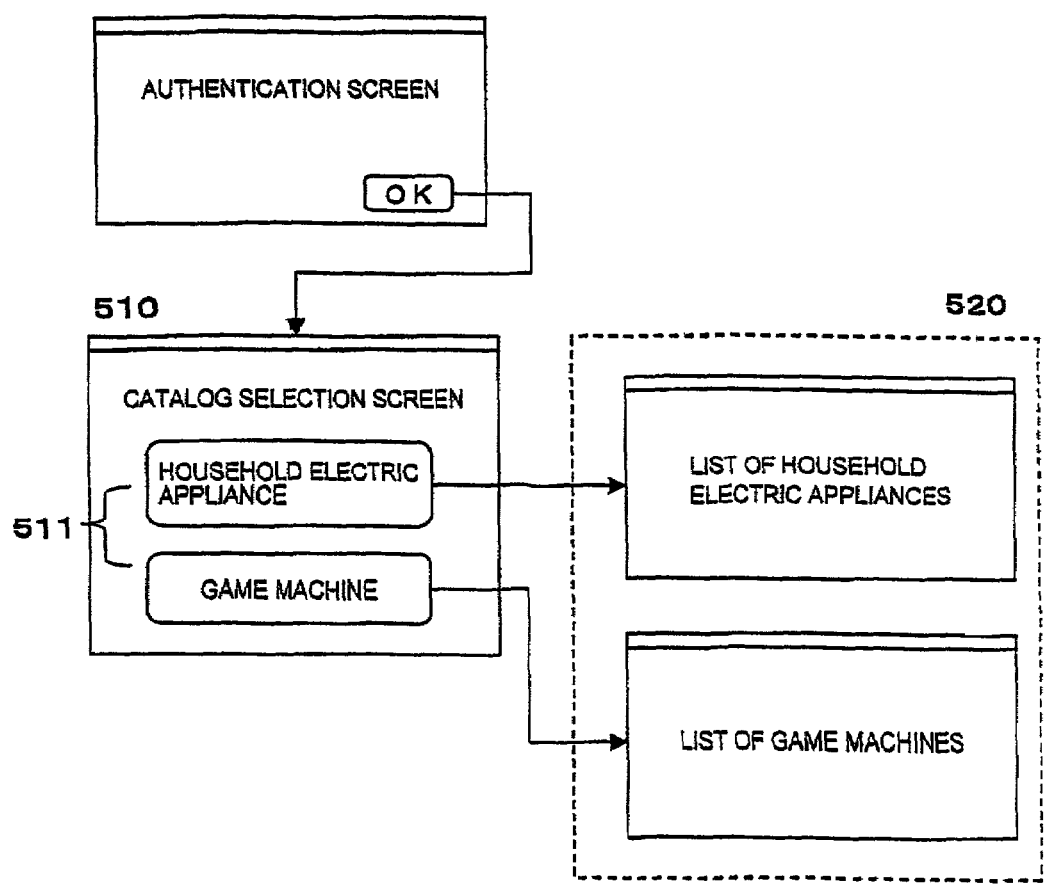
FIG. 12 is a diagram explaining transition of Web pages presented by a WWW server.

Next, the WWW server 211 presents Web pages showing commodities, to the customer apparatus 1 (S202). The Web pages showing commodities may be of a hierarchical structure, for example. FIG. 12 is a diagram explaining an example of transition of the Web pages in that case. The WWW server 211 presents a commodity catalog selection screen 510 onto the display unit 17 of the customer apparatus 1 that has finished the authentication processing. The commodity catalog selection screen 510 has a group of buttons 511 indicating properties of commodities, such as "household electric appliance", "game machine", "software", and the like, for example.

When a click of one of the buttons 511 is received, the WWW server 211 presents a commodity list screen 520 belonging to that property, to receive designation of commodities to purchase (S203).

Figure 13:
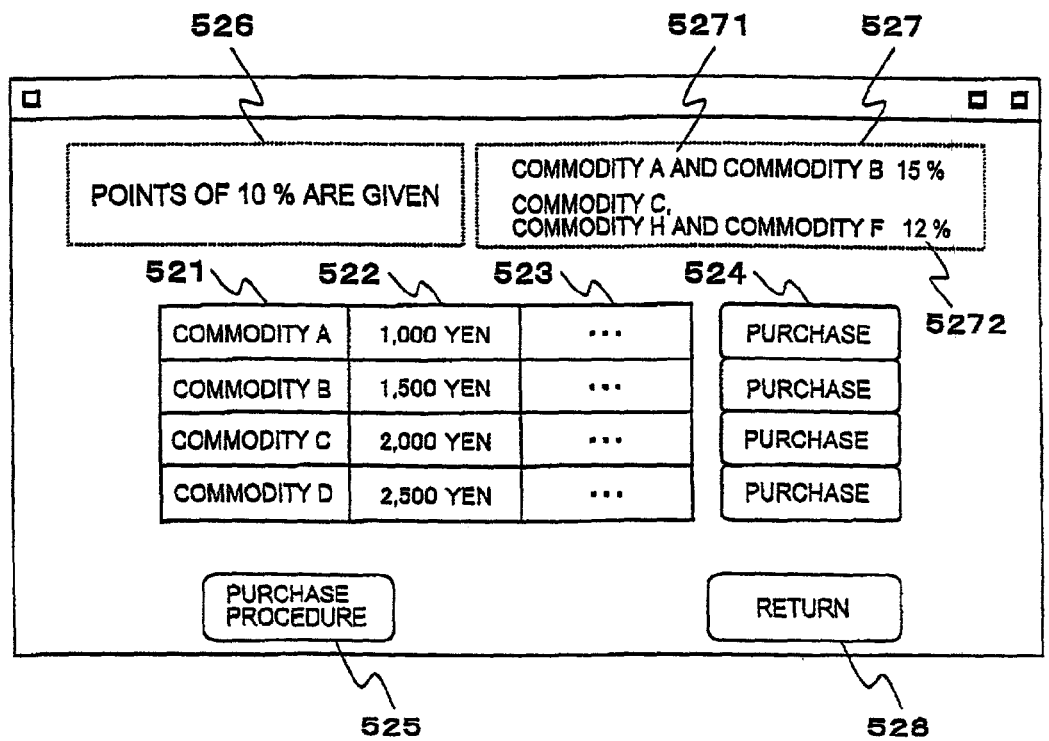
FIG. 13 is a view showing an example of a commodity list screen.

FIG. 13 is a view showing an example of the commodity list screen 520. This screen may have been prepared in advance and recorded in the Web generating data file 238, or may be dynamically generated for each displaying, referring to commodity data recorded in the commodity database 235. In that case, it is convenient to use a Web page template having a prescribed layout.

In the present figure, the commodity list screen 520 has an area 521 for displaying commodity names, an area 522 for displaying selling prices, an area 523 for displaying commodity images, purchase buttons 524, a purchase procedure button 525, a return button 528, a basic point rate display area 526, and a specific point rate display area 527.

A purchase button 524 is used for designating a corresponding commodity as a commodity to be purchased. Receiving a click of this button 524, the WWW server 211 records a list of commodities to be purchased in a temporary file in the external storage.

The purchase procedure button 525 is a button for entering purchase procedure with respect to the commodity to be purchased.

The return button 528 is a button for regenerating the commodity catalog selection screen 510.

In the specific point rate display area 517, are displayed specific combinations of commodities 5271, and respective point rates 5272 relating to those combinations.

The WWW server 211 refers to the point setting file 237, to display the mentioned information. Further, in the present embodiment, the point setting file 237 records a specific combination of commodities using their commodity IDs. Accordingly, the WWW server 211 refers to the commodity database 235 to extract commodity names corresponding to the commodity IDs recorded in the point setting file 237, and displays those commodity names in the specific point rate display area 527.

Here, by setting a specific point rate higher than the basic point rate, customers' will to purchase commodities belonging to a specific combination can be excited. As a result, it is effective to set a higher specific point rate to a combination of commodities on which increase of sales number is desired and commodities whose popularity is higher, for example.

Further, by setting a higher specific point rate for combination of one commodity with another commodity having strong relevance thereto, it is possible to provide campaign service for a customer.

Receiving designation of commodities to purchase and a click of the purchase procedure button 525, the WWW server 211 performs calculation processing of points to be given (S204).

The WWW server 211 refers to the temporary file, which records commodities to be purchased, and to the point setting file 237, for searching the group of commodities to be purchased, to confirm if there exist a specific combination of commodities recorded in the point setting file 237.

When a specific combination of commodities is extracted, then, specific points to that commodity are calculated as a value obtained by multiplying the total of their selling prices by their specific point rate. Of course, when a plurality of such combinations are included, similar operation is performed for each of the combinations, and the total sum becomes the specific points.

With respect to the other commodities, the total sum of the selling prices is multiplied by the basic point rate to obtain the basic points.

Then, the specific points and the basic points are added to obtain the points to be given.

Figure 14:
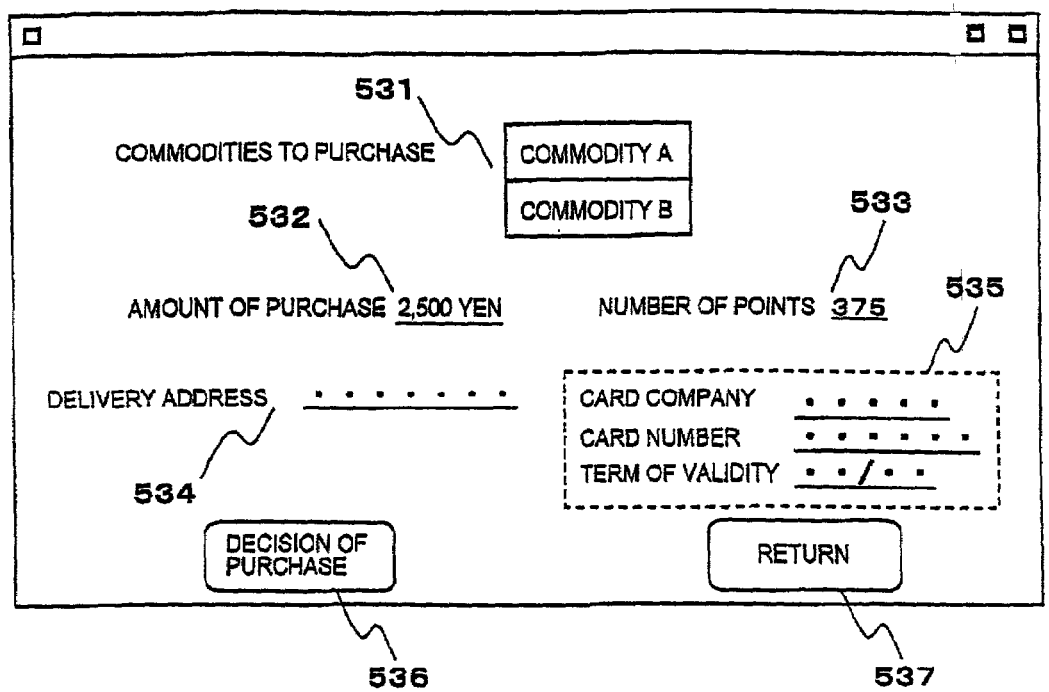
FIG. 14 is a view showing an example of a purchase procedure screen.

When the calculation of the points to be given is completed, the WWW server 211 presents a purchase procedure screen 530, for example as shown in FIG. 14, on the display unit 17 of the customer apparatus 1 (S205).

As shown in the figure, the purchase procedure screen 530 includes a list of commodities to be purchased 531, a purchase amount display area 532, a giving points display area 533, a delivery address display area 534, a payment method display area 535, a purchase decision button 536, and a return button 537 for regenerating the commodity list screen 520.

The WWW server 211 refers to the customer database 236, extracts information on the delivery address and the method of payment registered for each customer in advance, and displays the obtained information in the delivery address display area 534 and the payment method display area 535, respectively. Here, this screen may be used also for receiving alteration of commodities to purchase, alteration of the delivery address, alteration of the method of payment, or the like.

When the WWW server 211 receives a click of the purchase decision button 536, the WWW server 211 adds the number of points displayed in the giving points display area 533 to the number of points 2366 in the customer database. Further, the WWW server 211 adds the information on the purchase date and purchased commodities to the purchase history 2367 in the customer database 236.

Here, although timing of giving the pints can be decided arbitrarily, the points may be added to the customer database at the time of the delivery procedure not at the time when the purchase is decided. This is because, an online shop has a feature that an order and delivery of the commodity are not carried out at the same time. If points are given at the time of receiving an order, troublesome adjustment of points is required when order cancel or the like arises in the period between the reception of the order and the delivery of the commodity. In particular, this problem becomes larger in the case of an advance order. In that case, information that relates a customer ID to the number of given points may be temporarily recorded separately from the number of points 2366 in the customer database 236. Then, at the time of delivery, the temporarily-recorded points can be added to the number of points in the customer database 236 based on that information.

By the above mentioned processing, the processing for providing the online shop in the store apparatus 2 is completed. Based on the information received through a series of processes, the store performs the procedure of delivery of the purchased commodities to the customer. Further, according to the predetermined method of settlement, the settlement processing of the amount of purchase is performed.

Next, a second embodiment of the present invention will be described. In the first embodiment, a specific point rate for a specific combination of commodities is applied when those commodities are purchased at the same time.

In the second embodiment, a specific point rate is applied also when a specific combination of commodities is purchased in a certain period determined by a store in advance.

The basic configuration of the second embodiment of the present invention is similar to the first embodiment, and accordingly, differences will be described mainly. Further, with respect to a part having no difference, the same reference numeral is used in the description.

First, will be described difference in the processing in which the store apparatus 2 receives setting of points to be given.

In the second embodiment, in place of the point setting file 237 shown in FIG. 6, a point setting file 337 shown in FIG. 15 is used.

As shown in the figure, the point setting filed 337 stores a start date 3373 and an expiration date 3374, in addition to a commodity ID 3371 and a point rate 3372, relating those field one another.

Here, the start date and expiration date defines the start and the end of a period in which a specific point rate is applied. When a specific combination of commodities is purchased within this period (not necessarily at the same time), the specific point rate is applied.

Accordingly, in the processing in which the store apparatus 2 receives setting of points to be given, a start date 6023 and an expiration date 6024 are set, in addition to a specific combination of commodities 6021 and a specific point rate 6022, in a giving point setting screen 600, for example as shown in FIG. 16.

Hereinabove, have been described the differences in the processing in which the store apparatus 2 receives setting of points to be given.

Next, will be describe differences in the processing in which the store apparatus 2 receives access of the customer apparatus 1 and provides the online shop, referring to the flowchart shown in FIG. 10.

Figure 17:
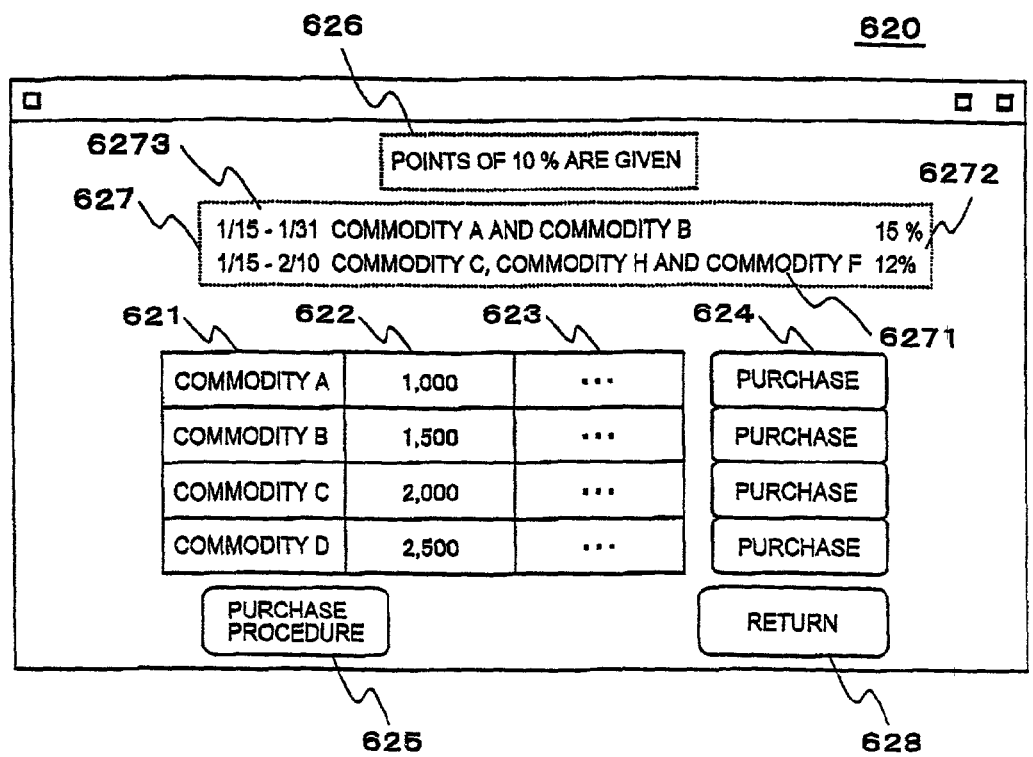
FIG. 17 is a view showing an example of a commodity list screen in the second embodiment.

FIG. 17 is a view showing an example of a commodity list screen 620 in the second embodiment. Here, the processing before displaying that screen 620 is similar to the first embodiment.

In this figure, an area 627 for displaying specific point rates includes an area 6273 for displaying application periods. Periods shown in the application period display area are displayed by the WWW server 211 referring to the start date 3373 and the expiration date 3374 of the point setting file 337.

Processing for receiving designation of commodities to purchase (S203) is similar to the first embodiment.

When a designation of commodities to purchase is received and a click of the purchase procedure button 525 is received, the WWW server 211 performs the giving point calculation processing (S204).

The WWW server 211 refers to the temporary file recording the commodities to be purchased, the purchase history 2367 in the customer database 236, and the point setting file 237, in order to judge if a specific combination of commodities recorded in the point setting file 237 is included in the group of commodities to be purchased, or in the group of commodities to be purchased and the group of commodities recorded in the purchase history 2367. Here, among the purchased commodities recorded in the purchase history 2367, the judgment is performed only with respect to the commodities whose purchase dates are included in the periods defined by the start dates 2273 and the expiration dates 3374 recorded in the point setting file 237.

When specific combination of commodities are extracted, specific points with respect to those combinations are calculated by multiplying the total of selling prices of each combination by the specific point rate concerned. However, when a commodity in the specific combination is recorded in the purchase history 2367, points obtained by multiplying the selling price of that commodity by the basic point is subtracted to calculate the specific points. This is performed to avoid duplication of the points given to the commodity recorded in the purchase history 2367.

With respect to the other commodities, the basic points are calculated by multiplying the total of the selling prices by the basic point rate. Then, the specific points and the basic points are added to obtain the number of points to give.

Processing thereafter is similar to the first embodiment.

The description presented above discusses generally the differences in the process in which the store apparatus 2 receives access of the customer apparatus 1 and provides the online shop.

The present invention is not limited to the above-mentioned embodiments, and may be variously modified within the gist of the invention.

For example, the number of points given to purchase of a specific combination of commodities may not be proportional to the purchase price, but may be a constant number of points. Or, an additional number of points (bonus points) may be given in addition to the number of points calculated with the basic point rate.

Further, in the above-described embodiments, the apparatus used by the store for setting the points to be given and the apparatus used for setting up the online shop are the same apparatus. However, these apparatuses may be separated. In that case, the apparatus on which the store sets up the online shop may be accessed through Internet, and a Web page may be used to set points to be given.

As described above, the present invention can excite customers' will to purchase specific commodities.

What is claimed is:

1. An order receiving apparatus that receives an order of commodity transaction from a commodity ordering apparatus through a network, comprising:
   a first storage means adapted to store commodity information that includes at least a commodity name and a selling price of a commodity as an object of transaction;
   a second storage means adapted to store information specifying combinations of two or more different commodities, and adapted to store specific parameters concerning economic return, which are applied respectively to said combinations, relating said information and said specific parameters, respectively;
   a third storage means adapted to store a general-purpose parameter concerning economic return, which is applied to commodities other than said combinations of commodities;
   a means adapted to perform steps of:
      receiving a request to display information on commodities, from said commodity ordering apparatus;
      referring to the first storage means, to output said commodity information to said commodity ordering apparatus; and
      referring to the second and third storage means, to output information on said combinations of commodities and said specific parameters applied respectively to said combinations, and information on said general-purpose parameter, to said commodity ordering apparatus; and
   a point generation means that performs steps of:
      receiving an order request including information to specify ordered commodities, from said commodity ordering apparatus;
      judging if a group of the ordered commodities specified includes commodities related to a combination recorded in the second storage means;
      calculating first points when it is judged that the commodities related to the combination are included, said first points being decided based on a specific parameter applied to said combination, or based on the specific parameter applied to said combination and on selling prices of the commodities related to said combination;
      calculating second points with respect to commodities other than the commodities related to said combination, based on the general-purpose parameters based on the general-purpose parameter and selling prices of the commodities in question; and
      outputting total points of the first points and the second points, to said ordering apparatus.

2. The order receiving apparatus according to claim 1, further comprising:
   a means adapted to receive identification information on a user of said ordering apparatus; and
   a fourth storage means adapted to store said total points, relating said total points to said identification information received.

3. The order receiving apparatus according to claim 1, wherein:
   said general-purpose parameter is a value defining a rate to a selling price of a commodity; and
   said second points are decided by multiplying the selling prices of the commodities in question by said rate.

4. The order receiving apparatus according to claim 1, wherein:
   said specific parameters is a value defining a rate to the selling prices of the commodities related to the combination concerned; and
   said first points are decided by multiplying the selling prices of the commodities related to the combination by said rate.

5. The order receiving apparatus according to claim 1, wherein:
   said specific parameter decides the number of said first points.

6. An order receiving apparatus that receives an order of commodity transaction from a commodity ordering apparatus trough a network, comprising:
   a first storage means adapted to store commodity information that includes at least a commodity name and a selling price of a commodity as an object of transaction;
   a second storage means adapted to store information specifying combinations of two or more different commodities, specific parameters concerning economic return, which arc applied respectively to said combinations, and periods applied respectively to said combinations, relating said information, said specific parameters, and said periods respectively;
   a third storage means adapted to store a general-purpose parameter concerning economic return, which is applied to commodities other than said combinations of commodities;
   a means adapted to perform steps of:
      receiving a request to display information on commodities, from said commodity ordering apparatus;
      referring to the first storage means, to output said commodity information to said commodity ordering apparatus; and referring to the second and third storage means, to output information on said combinations of commodities, said specific parameters and periods applied respectively to said combinations, and information on said general-purpose parameter, to said commodity ordering apparatus; and a point generating means, said point generating means performing steps of:

receiving an order request including user identification and information for specifying ordered commodities, from said commodity ordering apparatus;

judging it commodities related to a combination stored in the second storage means arc included in a group of the ordered commodities specified or in the group of the ordered commodities specified and commodities that are specified by the information stored in the fourth storage means and have dates included in the periods stored in the second storage means;

calculating first points when it is judged that the commodities related to the combination are included, said first points being decided based on a specific parameter applied to said combination, or based on the specific parameter applied to said combination and on selling prices of the commodities related to said combination;

calculating second points with respect to commodities other than the commodities related to said combination, based on the general-purpose parameter, or basal on the general-purpose parameter and selling prices of the commodities in question; and outputting total points of the first points and the second points, to said ordering apparatus.

7. The order receiving apparatus according to claim 6, further comprising:

a fourth storage means adapted to store user identification information on a user of a commodity ordering apparatus related to the order received, information for specifying commodities, and a date, related said user information, said information for specifying commodities and said date.

8. An order receiving method, in which an order of commodity transaction is received from a commodity ordering apparatus through a network, comprising steps of:

storing commodity information that includes at least a commodity name and a selling price of a commodity as an object of transaction;

storing information specifying combinations of two or more different commodities, and specific parameters concerning economic return, which are applied respectively to said combinations, relating said information and said specific parameters, respectively;

storing a general-purpose parameter concerning economic return, which is applied to commodities other than said combinations of commodities;

receiving a request to display information on commodities, from said commodity ordering apparatus;

displaying said commodity information to said commodity ordering apparatus;

displaying information on said combinations of commodities and said specific parameters applied respectively to said combinations, and information on said general-purpose parameter, onto said commodity ordering apparatus;

receiving an order request including information to specify ordered commodities from said commodity ordering apparatus;

judging if a group of the ordered commodities specified includes commodities related to a combination recorded in the second storage means;

calculating first points when it is judged that the commodities related to the combination are included, said first points being decided based on a specific parameter applied to said combination based on the specific parameter applied to said combination and on selling prices of the commodities related to said combination;

calculating second points with respect to commodities other than the commodities related to said combination, based on the general-purpose parameter based on the general-purpose parameter and selling prices of the commodities in question; and outputting total points of the first points and the second points, to said ordering apparatus.

9. An order receiving method, in which an order of commodity transaction is received from a commodity ordering apparatus through a network, comprising steps of:

storing commodity information that includes at least a commodity name and a selling price of a commodity as an object of transaction;

storing information specifying combinations of two or more different commodities, specific parameters applied respectively to said combinations, and periods applied respectively to said combinations, relating said information, said specific parameters, and said periods respectively; storing a general-purpose parameter applied to commodities other than said combinations of commodities;

receiving a request to display information on commodities, from said commodity ordering apparatus; displaying said commodity information to said commodity ordering apparatus; and displaying information on said combinations of commodities, said specific parameters and periods applied respectively to said combinations, and information on said general-purpose parameter onto said commodity ordering apparatus;

receiving an order request including information to specify ordered commodities, from said commodity ordering apparatus;

judging if a group of the ordered commodities specified includes commodities related to a combination recorded in the second storage means;

calculating first points when it is judged that the commodities related to the combination are included, said first points being decided based on a specific parameter applied to said combination, or based on the specific parameter applied to said combination and on selling prices of the commodities related to said combination;

calculating second points with respect to commodities other than the commodities related to said combination, based on the general-purpose parameter, or based on the general-purpose parameter and selling prices of the commodities in question; and outputting total points of the first points and the second points, to said ordering apparatus.

10. A computer-readable storage medium containing a set of instructions for a general purpose computer, the set of instructions for causing a computer to execute an order receiving processing, in which an order of commodity transaction is received from a commodity ordering apparatus connected through a network, which causes the computer to execute processes of:

storing commodity information that includes at least a commodity name and a selling price of a commodity as an object of transaction;

storing information specifying combinations of two or more different commodities, and specific parameters concerning economic return, which are applied respectively to said combinations, relating said information and said specific parameters, respectively;

storing a general-purpose parameter concerning economic return, which is applied to commodities other than said combinations of commodities;

receiving a request to display information on commodities, from said commodity ordering apparatus;

outputting said commodity information to said commodity ordering apparatus;

outputting information on said combinations of commodities and said specific parameters applied respectively to said combinations, and information on said general-purpose parameter, onto said commodity ordering apparatus;

receiving an order request including information to specify ordered commodities, from said commodity ordering apparatus;

judging if a group of the ordered commodities specified includes commodities related to a combination recorded in the second storage means;

calculating first points when it is judged that the commodities related to the combination are included, said first points being decided based on a specific parameter applied to said combination, or based on the specific parameter applied to said combination and on selling prices of the commodities related to said combination;

calculating second points with respect to commodities other than the commodities related to said combination, based on the general-purpose parameter, or based on the general-purpose parameter and selling prices of the commodities in question; and outputting total points of the first points and the second points, to said ordering apparatus.

11. A computer-readable storage medium containing a set of instructions for a general purpose computer, the set of instructions for causing a computer to execute an order receiving processing, in which an order of commodity transaction is received from a commodity ordering apparatus connected through a network, which causes the computer to execute processes of:

storing commodity information that includes at least a commodity name and a selling price of a commodity as an object of transaction;

storing information specifying combinations of two or more different commodities, specific parameters applied respectively to said combinations, and periods applied respectively to said combinations, relating said information, said specific parameters, and said periods respectively;

storing a general-purpose parameter applied to commodities other than said combinations of commodities;

receiving a request to display information on commodities, from said commodity ordering apparatus;

outputting said commodity information to said commodity ordering apparatus;

outputting information on said combinations of commodities, said specific parameters and periods applied respectively to said combinations, and information on said general-purpose parameter, to said commodity ordering apparatus;

receiving an order request including information to specify ordered commodities, from said commodity ordering apparatus;

judging if a group of the ordered commodities specified includes commodities related to a combination recorded in the second storage means;

calculating first points when it is judged that the commodities related to the combination are included, said first points being decided based on a specific parameter applied to said combination, or based on the specific parameter applied to said combination and on selling prices of the commodities related to said combination;

calculating second points with respect to commodities other than the commodities related to said combination, based on the general-purpose parameter, or based on the general-purpose parameter and selling prices of the commodities in question; and outputting total points of the first points and the second points, to said ordering apparatus.

12. A computer readable storing medium that stores die program according to any one of claims 10 and 11.

13. A point service method, in which points corresponding to an amount of purchase are given to a customer who has purchased commodities in an online shop, wherein:

when an order is received, a method of calculating points to be given is changed according to a combination of commodities related to the purchase, referring to a file that includes data relating the combination of commodities and information required for calculation of the points; and a point generating means performs steps of:
receiving an order request including information to specify ordered commodities from said commodity ordering apparatus;

judging if a group of the ordered commodities specified includes commodities related to a combination recorded in the second storage means;

calculating first points when it is judged that the commodities related to the combination are included, said first points being decided based on a specific parameter applied to said combination, or based on the specific parameter applied to said combination and on selling prices of the commodities related to said combination;

calculating second points with respect to commodities other than the commodities related to said combination, based on the general-purpose parameter, or based or the general-purpose parameter and selling prices of the commodities in question; and outputting total points of the first points and the second points, to said ordering apparatus.

* * * * *